United States Patent [19]
Smith et al.

[11] Patent Number: 5,621,125
[45] Date of Patent: Apr. 15, 1997

[54] FRACTIONATION OF TRIGLYCERIDE OILS UTILIZING CERAMIDE-BASE CRYSTALLIZATION MODIFIERS

[75] Inventors: Paul R. Smith, Wellingborough, Great Britain; Marcelle Van Den Kommer, Gouda, Netherlands

[73] Assignee: Van den Bergh Foods Co., Division of Conopco, Inc., Lisle, Ill.

[21] Appl. No.: 283,005

[22] Filed: Jul. 29, 1994

[30] Foreign Application Priority Data

Jul. 30, 1993 [EP] European Pat. Off. .............. 93306057

[51] Int. Cl.$^6$ ....................................... C11B 7/00
[52] U.S. Cl. .................... 554/211; 554/3; 554/5; 554/35; 554/61; 554/65; 554/175; 554/184; 554/185; 554/212
[58] Field of Search ............................ 554/10, 206, 208, 554/211, 227, 3, 5, 35, 61, 65, 175, 184, 185, 212; 426/601; 252/32.5

[56] References Cited

U.S. PATENT DOCUMENTS

| | | |
|---|---|---|
| 2,393,744 | 1/1946 | Brown . |
| 2,435,626 | 2/1948 | Gooding et al. . |
| 2,610,915 | 9/1952 | Mattil ........................................ 99/118 |
| 3,059,008 | 10/1962 | Baur ........................................ 260/420 |
| 3,059,010 | 10/1962 | Schmid et al. ........................... 260/428 |
| 3,059,011 | 10/1962 | Baur ........................................ 260/428 |
| 3,158,490 | 11/1964 | Baur et al. ................................ 99/118 |
| 3,536,461 | 10/1970 | Mueller et al. ............................. 44/62 |
| 4,524,085 | 6/1985 | Purves et al. ............................ 426/601 |
| 4,786,415 | 11/1988 | Shibata .................................... 210/635 |
| 4,960,544 | 10/1990 | Van Putte et al. ....................... 260/420 |
| 5,135,669 | 8/1992 | Brois et al. ............................. 252/32.5 |

FOREIGN PATENT DOCUMENTS

| | | |
|---|---|---|
| 3514878 | 11/1986 | Germany . |
| 1015354 | 12/1965 | United Kingdom . |
| 1282474 | 7/1972 | United Kingdom . |

OTHER PUBLICATIONS

Gunstone, F., The Lipid Handbook 1986, pp. 213–216.
The Merck Index, An Encyclopedia of Chemicals, Drugs and Biologicals, 11th ed. (1989).
PCT Search Report.
Chemical Abstracts, Moran, D. P. J., Rev. Int. Choc., "Influence of some surfactants on the viscosity of confectionary fat/sugar mixtures", 24(12), pp. 478–482, 1969, 73:97589.
Gunstone, H., The Lipid Handbook 1986, pp. 213–215, described on page 1.
Fette, Seifen, Anstrichmittel, "A Method for the Determination of the Solid Phase Content of Fats Using Pulse Nuclear Magnetic Resonance", 1978, 80 nr. 5 pp. 180–186, described on page 6 and English equivalent.
Franz, G., "Polysaccharide" §1.4.2, p. 7.
International Search Report.

Primary Examiner—Gary Geist
Assistant Examiner—Deborah D. Carr
Attorney, Agent, or Firm—A. Kate Huffman

[57] ABSTRACT

A triglyceride oil containing a membrane lipid in a concentration effective for crystallization modification the membrane lipid having a formula:

$$C_{13}H_{27}-CH=CH-CH(OH)-CH(NHCOA_2)-CH2-OA_4,$$

wherein $C_{13}H_{27}$— is an unbranched alkyl chain, $A_2$ is an unbranched $C_{23}H_{47}$— hydrocarbon chain, and $A_4$ is a sugar moiety selected from the group consisting o a monosaccharide residue, a disaccharide residue or an oligosaccharide residue, including glucose, fructose, galactose, saccharose, lactose and maltose. Said membrane is utilized to separate solid fatty materials from triglyceride oils by heating the oil in an inert solvent until a substantial amount of the solid material is no longer present, adding the membrane lipid as the crystallization modifying substance, cooling the oil to crystallize a solid stearin phase in combination with a liquid olein phase, and recovering the stearin phase by separating it from the olein phase.

9 Claims, 3 Drawing Sheets

FRACTIONATION OF TRIGLYCERIDE OILS UTILIZING CERAMIDE-BASE CRYSTALLIZATION MODIFIERS

The present invention is concerned with a process for fractionating triglyceride oils. The fractionation (fractional crystallisation) of triglyceride oils is described by Gunstone, Harwood and Padley in The Lipid Handbook, 1986 edition, pages 213–215. Generally triglyceride oils are mixtures of various triglycerides having different melting points. Triglyceride oils may be modified e.g. by separating from them by crystallisation a fraction having a different melting point or solubility.

One fractionation method is the so-called dry fractionation process which comprises cooling the oil until a solid phase crystallises and separating the crystallised phase from the liquid phase. The liquid phase is denoted as olein fraction, while the solid phase is denoted as stearin fraction. The separation of the phases is usually carried out by filtration, optionally applying some kind of pressure.

The major problem encountered with phase separation in the dry fractionation process is the inclusion of a lot of liquid olein fraction in the separated stearin fraction. The olein fraction is thereby entrained in the inter- and intracrystal spaces of the crystal mass of the stearin fraction. Therefore the separation of the solid from the liquid fraction is only partial.

The solids content of the stearin fraction is denoted as the separation efficiency. For the dry fractionation of palm oil it seldom surpasses 50 wt. %. This is detrimental to the quality of the stearin as well as the yield of the olein. For the related solvent fractionation process, where the fat to be fractionated is crystallised from a e.g. hexane or acetone solution, separation efficiencies may be up to 95%.

Dry fractionation is a process which is cheaper and more environmentally friendly than solvent fractionation. For dry fractionation an increase of separation efficiency is therefore much desired.

It is known to add to a crystallising oil a crystallisation modifying substance. The presence of small quantities of such a substance in the cooling oil may accelerate, retard or inhibit crystallisation.

Known crystallisation modifiers are e.g. sucrose fatty acid esters, described in U.S. Pat. No. 3,059,010 and fatty acid esters of glucose and derivatives, described in U.S. Pat. No. 3,059,011. These crystallisation modifiers are effective in speeding up the crystallisation rate but are not reported to increase the separation efficiency. They do not even allude to such an effect.

Other crystallisation modifiers, e.g. as described in U.S. Pat. No. 3,158,490 when added to kitchen oils have the effect that solid fat crystallisation is prevented or at least retarded. Other types of crystallisation modifiers, often referred to as crystal habit modifiers, are widely used as an ingredient for mineral fuel oils in which waxes are prone to crystallize at low temperatures. U.S. Pat. No. 3,536,461 teaches the addition of a crystal habit modifier to fuel oil with the effect that the cloud point (or pour point) temperature is lowered far enough to prevent crystal precipitation. Or, alternatively, the solids are induced to crystallize in a different habit so that the crystals when formed can pass fuel filters without clogging them.

Other crystal habit modifiers are actually able to change the habit of the crystallized triglyceride fat crystals in a way such that after crystallization the crystals, the stearin phase, can be more effectively separated from the liquid phase, the olein phase. Publications describing such crystal habit modifiers are e.g. GB 1 015 354 or U.S. Pat. No. 2,610,915 where such effect is accomplished by the addition of a small amount of a polymerisation product of esters of vinyl alcohol or of a substituted vinyl alcohol. U.S. Pat. No. 3,059,008 describes the use of dextrin derivatives for the same purpose. However, these crystallisation modifying substances are still far from ideal. In the former case after three days of crystallization an increase in olein yield from 71% to only 82% was reported. Although such improvement may seem fair, a need exists for more powerful crystallisation modifying substances which act faster and in a dry fractionation environment and which deliver still better improvements in olein yield. The selection of such habit modifiers is a problem, because it is not possible to predict which substances will successfully comply with this requirements.

None of the crystallisation modifying substances known to date can be obtained without a chemical preparation. These substances therefore have to be subjected to lengthy approval investigations before the status food grade can be allowed. This is a serious disadvantage when quick application of the invention is desired.

STATEMENT OF INVENTION

It has been found, that membrane lipids can suitably perform as crystallisation modifying substances.

Accordingly the invention provides a process for separating solid fatty material from a triglyceride oil, which comprises the steps A. heating the oil or a solution of the oil in an inert solvent until no longer a substantial amount of solid material is present, B. adding a crystallisation modifying substance to the oil or to the solution of the oil, C. cooling the oil resulting in crystallising a solid stearin phase besides a liquid olein phase and D. recovering the stearin phase by separating it from the olein phase, characterized in that the crystallisation modifying substance is a membrane lipid.

Membrane lipids can be obtained from membranes containing animal or plant tissues or organs, e.g. by isolation from nervous tissue, particularly from brain tissue.

The presence of a membrane lipid in an effective concentration has the effect that in the oil crystals and crystal aggregates are formed which are conspicuously different from the crystals obtained without crystallisation modifying substance. These crystals and aggregates can be filtered more effectively, in that the stearin fraction retains less of the olein fraction even at low or moderate filtration pressure. The altered crystallisation results therefore in a considerable increase of the separation efficiency.

According to a further aspect of the invention the process is carried out using as crystallisation modifying substance a membrane lipid chosen from the group comprising I lipids having the formula

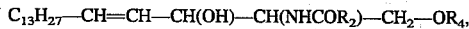

$R_4$ is hydrogen (comprises ceramides) or $R_3$, $C_{13}H_{27}$— is an unbranched alkyl chain, II lipids having the formula

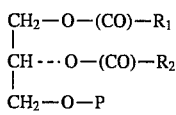

including the corresponding lysophosphatides where one of the ester groups have been hydrolysed, III lipids having the formula

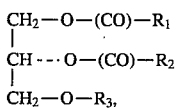

where (II and III)

$R_1$ and $R_2$ are unbranched (C1–C24)-hydrocarbon chains, provided at least one of $R_1$ and $R_2$ is a (C8–C24)-hydrocarbon chain. Preferably both $R_1$ and $R_2$ are unbranched (C8–C24)-hydrocarbon chains.

P is a phosphoryl moiety, which comprises phosphoryl serine, phosphoryl ethanolamine, phosphoryl choline, diphosphoryl glycerol and phosphoryl inositol according to FIGS. 5–9 respectively and where $R_3$ is a sugar moiety which comprises a monosaccharide residue, a disaccharide residue or an oligosaccharide residue, including glucose, fructose, galactose, saccharose, lactose and maltose residues, IV a sphingomyelin according to FIG. 1, V a cerebrosides according to FIG. 3, where [S] is a sugar moiety chosen from the group comprising a monosaccharide residue, a disaccharide residue or an oligosaccharide residue, including glucose, fructose, galactose, saccharose, lactose and maltose residues.

VI mixtures of lipids taken from groups I–V.

DETAILS OF THE INVENTION

The oil to be fractionated is mixed with the crystallisation modifying substance before crystallisation starts. The oil is heated so that all solid triglyceride fat and preferably also the modifying substance is liquefied.

Then the oil is cooled to the chosen crystallisation temperature. A suitable crystallisation temperature for e.g. palm oil is 15°–35° C. By choosing a different temperature the composition of the olein and stearin phases may change. Crystallisation proceeds at the chosen temperature until a constant solid phase content is reached. The crystallisation time varies depending on the desired solid phase content. Usual times are in the range of 4–16 hours. During crystallisation the oil may be stirred, e.g. with a gate stirrer. Stagnant crystallisation sometimes gives the best separation efficiency.

For the separation of the solid phase from the liquid phase generally a membrane filter press is used, because it allows rather high pressures. Suitable pressures are 3–50 bar, to be exerted for about 20–200 minutes. However, even with a low or moderate pressure the stearin phase obtained according to the present invention is easily separated from the olein phase. As a rule it takes about 30–60 minutes to have both phases properly separated.

The solids content of the crystal slurry before separation and of the separated stearin phase is measured according to the known pulse NMR method (ref. Fette, Seifen, Anstrichmittel 1978, 80, nr. 5, pp. 180–186).

The present process for obtaining stearin with increased solid levels is characterised by the use of a crystallisation modifying substance which is a membrane lipid as generally indicated above.

The invention particularly includes membrane lipids obtainable by isolation from nervous tissue, particularly from brain tissue. Generally such lipids may be denoted as Cephalins. A method for their isolation is described in J. Biol. Chem. 146, 35 (1942). Included are similar molecules comprised within the above molecular definition which are not necessarily produced in nervous tissue but may be found in other membranes of animals and of plants as well. It is even conceivable that the compounds can be prepared by a biological process, using e.g. a micro-organism, which may be a genetically engineered micro-organism.

The substances to be used in the present invention are freely available on the market. The SIGMA company sells an extract denoted as Brain lipid VIII which contains inter alia cerebrosides (30 wt %), sulphatides (10 wt. %) and sphingomyelin (30 wt. %). Another lipid mixture (ex SIGMA) is Brain lipid VI which contains inter alia phospholipids and glycolipids, including gangliosides. SIGMA's Brain lipid VIII can be prepared using the procedure described in J. Biol. Chem. 146, 35 (1942), followed by leaching with diethyl ether. The desired lipid is the residue which remains after ether extraction.

The lipids of the present invention may be used as a crude concentrate containing several lipids according to the invention such as the mentioned and exemplified isolates Brain lipid VI and Brain lipid VIII or, alternatively, they may be used in an isolated and purified form.

Alternatively, the compounds may be prepared by chemical or biochemical methods. For the relevant compounds standard preparations are available which are within the skill of the average technician.

An option for the preparation of the lipids according to the invention, though not deemed natural, is to start from isolated lipids or from not or not fully esterified precursor molecules and to attach fatty acid chains to their molecules e.g. by esterification of one or more of their hydroxyl groups. Such molecular changes might further improve the crystallisation modifying activity.

For obtaining the best results with the crystallisation modifying substances of the present invention the length of at least one of their hydrocarbon chains should preferably match the length of the fatty acid chains of the desired stearin phase. Matching occurs when the chains have the same or about the same number of carbon atoms. Therefore, when palm oil is fractionated, C16- and C18-hydrocarbon chains are preferred.

The process of the invention preferably is carried out as a dry fractionation process, although the invention is useful too for solvent fractionation or detergent fractionation.

The process can be applied on triglyceride oils containing relatively high melting fat such as palm oil, palm kernel oil, shea oil, coconut oil, cottonseed oil, butter oil, hydrogenated rapeseed oil, hydrogenated soybean oil or fractions of these oils or oils obtained from the previous oils by interesterification. The process is particularly useful for fractionating palm oil. The palm oil might be crude, but generally a refined quality is used.

The crystallisation modifying substance is suitably applied in an amount of 0.005–2 wt. %, preferably 0.01–1 wt. % on the total amount of oil.

A typical embodiment of the invention are mixtures of triglyceride oils in which a membrane lipid has been incorporated in a concentration in which it is effective for crystallisation modification. The invention not only comprises mixtures of triglyceride oils with membrane lipids in general, but also with the groups of membrane lipids specifically mentioned before.

A further aspect of the invention is any use of the aforementioned substances either alone or mixed as triglyceride oil crystallisation modifying substance.

BRIEF DESCRIPTION OF THE DRAWINGS

The invention comprises in particular the use of compounds taken from the groups comprising
  sphingomyelin according to FIG. 1
  cerebrosides according to FIGS. 3–4, where [S] is a sugar moiety
  phosphoglycerides according to FIG. 2, where [P] is a moiety comprising phosphoryl serine, phosphoryl ethanolamine, phosphoryl choline, diphosphoryl glycerol and phosphoryl inositol according to FIGS. 5–9 respectively, where $R_1$ and $R_2$ are unbranched (C1–C24)-hydrocarbon chains provided at least one of $R_1$ and $R_2$ is a (C8–C24)-hydrocarbon chain,
as a triglyceride oil crystallisation modifying substance.

A major advantage for most of the compounds of the present invention is their natural status. Since they have been isolated from material which is allowed for food, they might more easily be allowed for use as additives for edible oils.

EXAMPLE 1

Dry fractionation of palm oil

Figure 1:
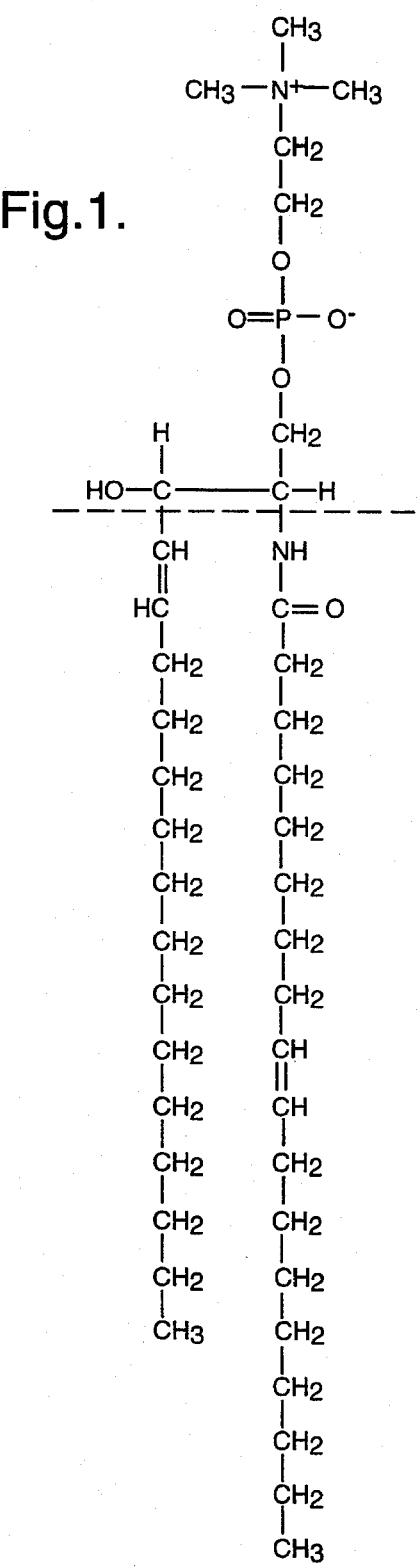
Figure 2:
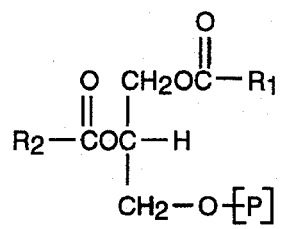
Figure 3:
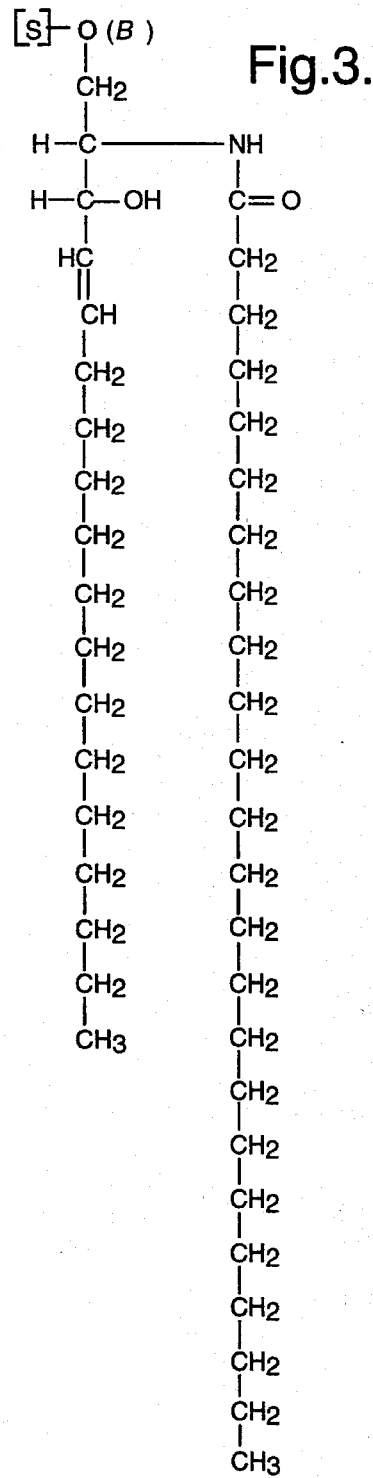
Figure 4:
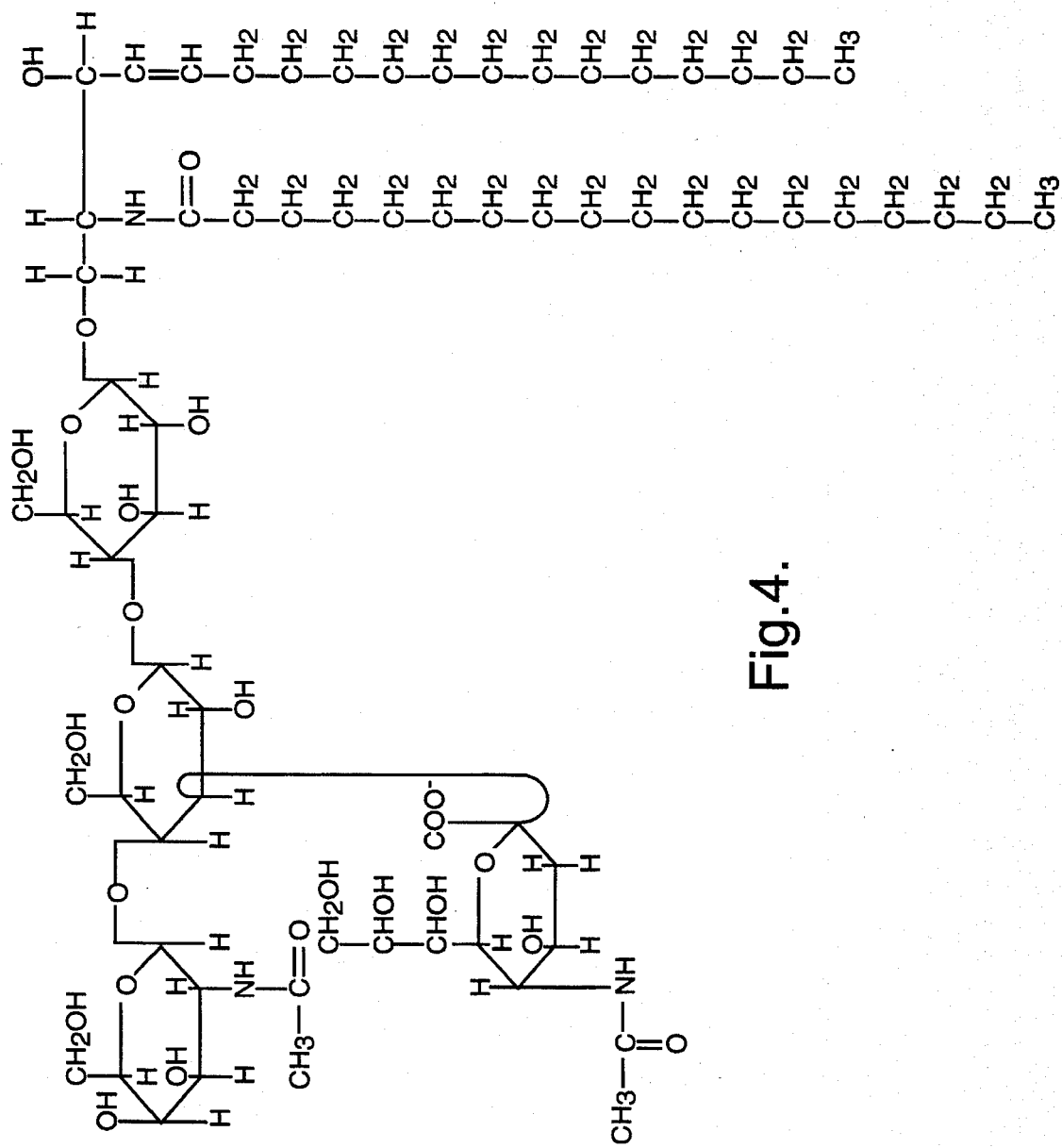
Figure 5:
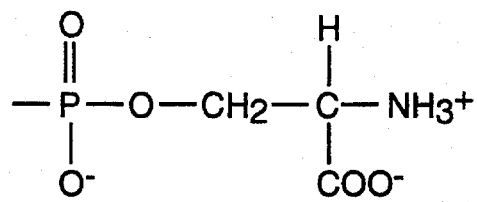
Figure 6:
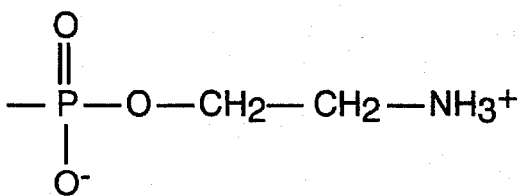
Figure 7:
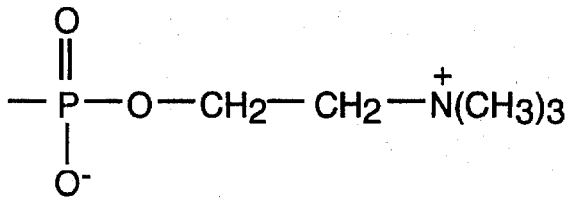
Figure 8:
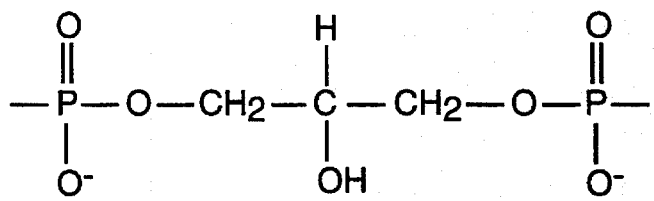
Figure 9:
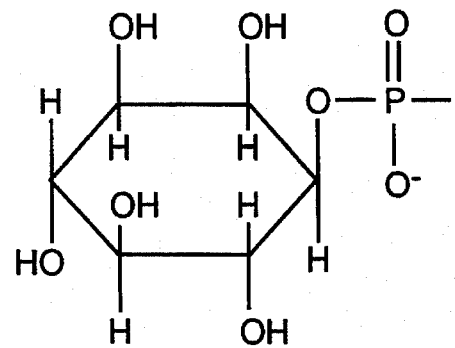

Two samples were prepared each containing 1000 g of palm oil (neutralised, bleached, deodorised). The process is carried out as a common dry fractionation process, but to the first sample (A) 1.6 g (0.16%) of Brain lipid VI (ex SIGMA) was added as crystallisation modifying substance, to the second sample (B) no crystallisation modifying substance was added.

Both samples were heated at 70° C. until completely liquefied (no solid fat content) and then cooled in order to crystallise. Crystallisation proceeded without stirring (stagnant) at the chosen temperature of 23° C. for 16 hours until a constant solid phase content was reached. The samples were pressed in a membrane filter for one hour. After filtration the separated fractions were weighed. The olein yield is the weight of the filtrate. The stearin yield is the weight of the crystal mass remaining on the filter. The yields of the measured stearin and olein fractions are given in table I.

TABLE I

|  | Sample A 0.16 wt. % modifier | Sample B no modifier |
| --- | --- | --- |
| Temperature/°C. | 23 | 23 |
| Solid phase content slurry/% | 13.1 | 13 |
| Solid phase content cake/% | 44 | 31 |
| Olein yield/% | 70 | 58 |

Before filtration the two samples contained the same amount of solid fat. The comparison shows that the stearin fraction of the crystallisation modifying substance containing sample (A) has retained considerably less olein fraction than sample (B) without a crystallisation modifying substance. The separation efficiency showed a relative increase of 42%.

EXAMPLE 2

Dry fractionation of palm oil

Example 1 was repeated but the crystallisation modifying substance was 1.6 g (0.16%) of Brain lipid VIII (ex SIGMA).

The oil was allowed to crystallise for 16 hours without stirring (stagnant). The fractionation results are given in Table II.

TABLE II

|  | Sample A 0.16 wt. % modifier | Sample B no modifier |
| --- | --- | --- |
| Temperature/°C. | 23 | 23 |
| Solid phase content slurry/% | 13.3 | 13 |
| Solid phase content cake/% | 61 | 31 |
| Olein yield/% | 78 | 58 |

The separation efficiency showed a relative increase of 97%.

We claim:

1. A process for separating solid fatty material from a triglyceride oil comprising the steps of:
   a) heating the oil or a solution of the oil in an inert solvent until a substantial amount of solid material is no longer present;
   b) adding a crystallization modifying substance to the heated oil or to the heated solution of the oil, the substance being a membrane lipid selected from the group consisting of lipids having a formula:

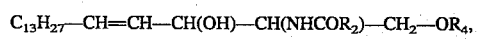

wherein
   $C_{13}H_{27}-$ is an unbranched alkyl chain,
   $R_2$ is an unbranched (C1–C24)-hydrocarbon chain
   $R_4$ is hydrogen or a sugar moiety which comprises a monosaccharide residue, a disaccharide residue or an oligosaccharide residue, including glucose, fructose, galactose, saccharose, lactose and maltose residues;
   c) cooling the oil of step b to crystallize a solid stearin phase in combination with a liquid olein phase; and
   d) recovering the stearin phase by separating it from the olein phase.

2. A process according to claim 1 wherein the process is a dry fractionation process.

3. A process according to claims wherein the oil to be fractionated is palm oil, palm kernel oil, shea oil, coconut oil, cottonseed oil, butter oil, hydrogenated rapeseed oil, hydrogenated soybean oil or fractions of these oils or oils obtained from the previous oils by interesterfication.

4. A process according to claim 1 wherein the crystallization modifying substance is used in an amount of 0.005–2 wt. %.

5. A triglyceride oil containing a membrane lipid in a concentration effective for crystallization modification, the membrane lipid being one or more compounds selected form the group consisting of lipids having the formula:

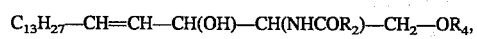

wherein

C$_{13}$H$_{27}$— is an unbranched alkyl chain, R$_2$ is an unbranched (C1–C24)-hydrocarbon chain, and R$_4$ is hydrogen or a sugar moiety which comprises a monosaccharide residue, a disaccharide residue or an oligosaccharide residue, including glucose, fructose, galactose, saccharose, lactose and maltose residues.

6. A triglyceride oil according to claim 5 wherein the oil is obtained from a vegetable source.

7. A triglyceride oil according to claim 5 wherein the membrane lipid has a concentration of 0.005–2 wt. %, of the total amount of oil.

8. A triglyceride oil containing a membrane lipid in a concentration effective for crystallization modification the membrane lipid having a formula:

$$C_{13}H_{27}-CH=CH-CH(OH)-CH(NHCOA_2)-CH_2-OA_4,$$

wherein

C$_{13}$H$_{27}$— is an unbranched alkyl chain, A$_2$ is an unbranched C$_{23}$H$_{47}$— hydrocarbon chain, and A$_4$ is a sugar moiety selected from the group consisting of a monosaccharide residue, a disaccharide residue or an oligosaccharide residue, including glucose, fructose, galactose, saccharose, lactose and maltose residues.

9. A triglyceride oil according to claim 8 wherein the oil is obtained from a vegetable source.

* * * * *